June 6, 1967 M. J. KJOS 3,323,702

TAPE BRAKING AND GUIDING DEVICE

Filed June 21, 1965

INVENTOR.
MAGNE JARLE KJOS
BY
Christie, Parker & Hale
ATTORNEYS

United States Patent Office 3,323,702

Patented June 6, 1967

3,323,702

TAPE BRAKING AND GUIDING DEVICE

Magne Jarle Kjos, Duarte, Calif., assignor to Burroughs Corporation, Detroit, Mich., a corporation of Michigan Filed June 21, 1965, Ser. No. 465,669
9 Claims. (Cl. 226—50)

Figure 1:
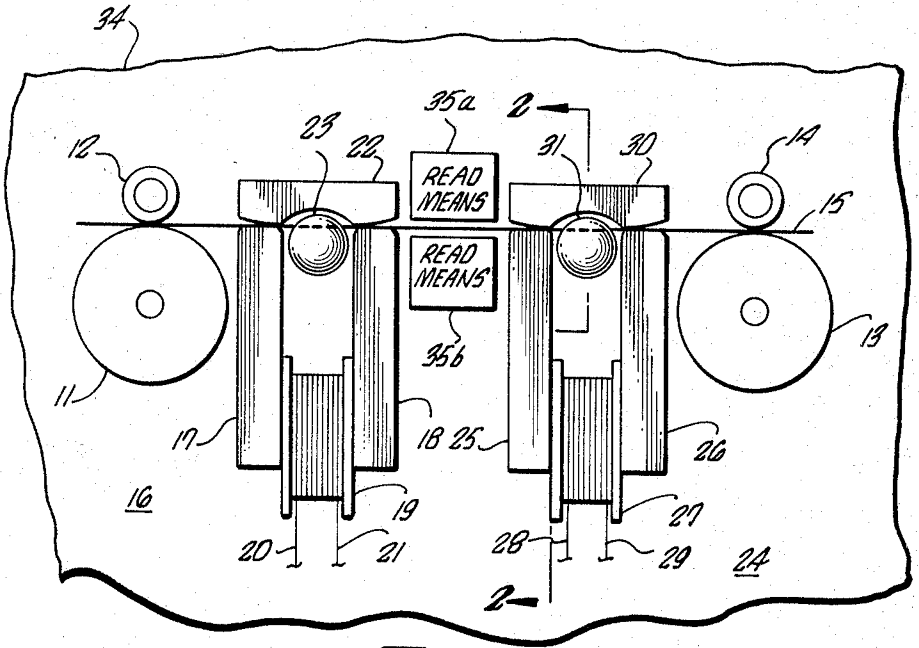

This invention relates to tape transport systems and more particularly to a bidirectional tape braking and guiding device.

A tape transport system generally includes a device for operating upon the tape, for example, a punch or a tape reader such as a bank of photocells and a light source. The transport system further includes a pair of capstan drive units, one positioned on either side of the operating device for imparting forward and reverse movement to the tape through the operating device. Each capstan drive unit will generally include a capstan drive roller and a pinch roller which is activated to pinch the tape between the two rollers and thereby impart longitudinal movement to the tape. If, however, the capstan and pinch roller are not exactly aligned, they will cause skew and buckling in the tape. Misalignment of the tape may also be caused by rapid starting and stopping of the tape.

For proper reading and writing operations, it is essential that the tape be properly aligned as it passes the operating station. Any lateral or vertical misalignment of the tape with respect to the reading or writing head may seriously intefere with the reading or writing of information. In order to accommodate tapes of various widths and having different information patterns, it is advantageous to be able to adjust the lateral alignment of the tape with respect to the reading or writing head. Such lateral adjustments may advantageously be achieved by means of the adjustable tape guiding and positioning device disclosed in the copending patent application of D. J. Griffiths, Ser. No. 285,124, filed June 3, 1963, now Patent No. 3,204,845 issued Sept. 7, 1965, and assigned to the assignee of the present application. Lateral and vertical misalignment are, however, corrected in separate operations. Moreover, any buckling of the tape in the area of lateral correction interferes with the lateral correction made by the aforementioned or other guiding devices. Thus it becomes advantageous to correct vertical misalignment prior to the correction of lateral misalignment.

An advantage of the present invention is that vertical misalignment is corrected prior to the correction of lateral misalignment thereby maximizing the lateral correction.

A tape transport system generally must include fast acting braking means. Thus, if a character representing a "stop" command is read by a read head past which the tape is being transported, the tape must be made to stop before the next character reaches the read head. That such braking must be quite rapid is indicated by the fact that such characters are often a distance apart which is on the order of 0.1 inch and by the fact that the tape speed may exceed 100 inches per second. To selectively stop the forward and reverse movement of the tape, conventional tape transports often include a pair of brake units, one adjacent each capstan drive unit, with a capstan drive unit on one side of the read or write head and a brake unit on the opposite side controlling forward movement of the tape and the remaining capstan drive and brake unit controlling reverse movement of the tape. Bidirectional tape transports having a single brake unit are also known.

Magnetic braking devices may advantageously be used as the braking means of a tape transport system. Such devices may include a support member of magnetic material having a pair of spaced support surfaces positioned to contact and support the surface of a moving tape. Positioned on the opposite side of the tape is a clapper of magnetic material hinged to float on the upper surface of the tape. Stopping of the tape is controlled by means of a magnetic field developed between the support member and the clapper to attract the clapper toward the support member and to pinch the tape between the support surfaces and the clapper, thereby preventing the tape from moving in a longitudinal direction. Such a magnetic braking device, however, is often unsatisfactory when a spliced portion of tape is passing beneath the clapper. The increased thickness of the splice may cause the clapper momentarily to bounce, thereby disabling the brake from properly operating at this time. The bouncing may be minimized, but any such raising of the clapper will decrease the attractive force generated between the clapper and the support member, thereby interfering with satisfactory operation of the brake.

Another advantage of the present invention is that it provides a tape transport assembly having full ability to stop on tape splices and having good stopping characteristics while the tape is driven in either direction.

Tape transport assemblies having a single magnetic braking unit within which a reading head is positioned are also known. One such assembly is shown in Patent No. 3,119,020, of A. C. Olson et al., issued Jan. 21, 1964. In the brake means shown in the aforesaid patent, an upper portion of the brake rides on the tape and has an aperture therein to permit the passage of light therethrough. Light passing through the aperture in the brake actuates an electro-optical reading means. It has been found, however, that particles of dust from the tape, which are sometimes in the form of small particles of cellulose, may gather in the cavity formed by the tape and the aperture within the upper brake portion and eventually interfere with the reading operation.

Another advantage of the present invention is that electro-optical reading techniques may be utilized with little danger of interference caused by dust accumulation.

Yet another advantage of the present invention is that it provides a compact tape transport assembly in which tape guides, brakes and capstans are all located close to the read or write head.

The above and other advantages are realized in a tape transport assembly having two clapper type magnetic brakes with an adjustable tape guiding and positioning device within each brake unit. A read or write head is positioned immediately between the two brake units and a capstan drive unit is positioned immediately adjacent the opposite side of each brake unit. Thus, a compact assembly is achieved with the drive units, brake units and tape guides all being positioned close to the read or write head.

Since the clapper portion of each brake unit floats on the upper surface of the tape, it will correct vertical misalignment in the tape prior to the correction of lateral misalignment by the tape guide within the brake unit. Hence, maximum use of the guide's ability to correct lateral misalignment may be utilized.

Each of the two brake units is activated independently whenever a "stop" signal is received. Thus, even though one unit may be temporarily incapacitated as the result of a spliced portion of the tape passing therethrough, the other brake unit will be sufficient to stop the tape. Regardless of the direction of tape drive, at least one of the brakes will always be capable of stopping the tape. Since the two brake units are positioned a short distance apart, any two splices would in practice always be a distance apart greater than the distance between the brake units.

Since the read or write head is positioned between the two brake units, electro-optical reading means may be utilized with no danger of collections of dust interfering with the reading operation.

Figure 2:
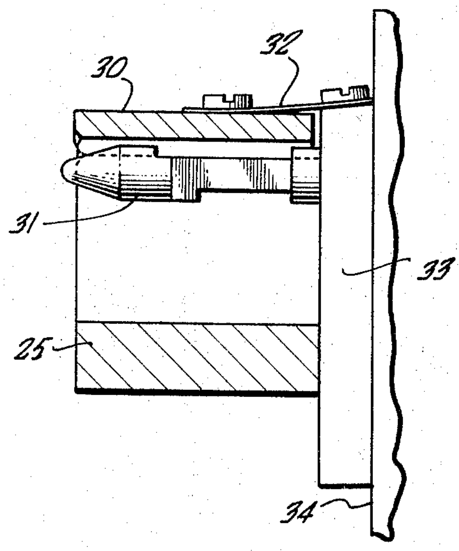

The manner of operation of the present invention and the manner in which it achieves the above and other advantages may be more clearly understood by reference to the following detailed description when considered with the drawing, in which:

FIG. 1 is a schematic representative of the front view of the bidirectional tape braking and guiding means of the present invention; and FIG. 2 is a sectional side view of one of the braking units taken along the line 2—2 of FIG. 1.

FIGS. 1 and 2 depict a schematic representation of a preferred embodiment of the present invention. Capstan roller 11 and its associated pinch roller 12 and capstan roller 13 and its associated pinch roller 14 impart bidirectional longitudinal movement to tape 15 in a conventional manner. A first brake unit 16 includes a U-shaped core element having a pair of legs 17 and 18 whose ends are shaped to provide vertical support for the lower surface of tape 15. A coil 19 is wound upon the portion of the U-shaped core joining legs 17 and 18 and leads 20 and 21 extend from this coil. Positioned above the tape is a clapper 22. Both the clapper 22 and core member are composed of a magnetic material. As illustrated, the clapper 22 is arranged to effectively float on the upper surface of the tape 15, contacting the upper surface of the tape on the sides of the tape directly opposite legs 17 and 18. A guiding and positioning device 23 is positioned betwen the legs 17 and 18 and also provides vertical support for the tape 15. The guiding and positioning device 23 may advantageously comprise a rotatable guide having slots cut therein to accommodate various widths of tape such as the guide described in the patent of D. J. Griffiths, previously referred to.

A second brake unit 24 identical to the first is shown to include a U-shaped core member having legs 25 and 26, a coil 27 having leads 28 and 29, a clapper 30 and a positioning and guiding element 31. The clappers 22 and 30 continuously float upon the upper surface of the tape 15. They continuously exert a downward force upon the tape to prevent the tape from moving in a vertical direction as it passes through the elements 23 and 31. To provide such downward force, spring members are utilized to spring load the clappers against the tape. This may be seen in FIG. 2, which depicts a cross-sectional view of brake unit 24. Spring member 32 is shown to be cantilevered from an upper surface of back plate 33. Back plate 33 may comprise a non-magnetic material and is conventionally affixed to front panel 34. For illustrative purposes back plate 33 is not shown in FIG. 1.

In order to reduce the frictional drag of the clappers 22 and 30 on the tape 15, the lower surfaces of the clappers and the upper surfaces of legs 17, 18, 25, and 26 may be plated with a thin film of a non-magnetic, low friction material.

As indicated in FIG. 1, the spring loaded clappers 22 and 30 prevent vertical misalignment of the tape 15 as it passes through guides 23 and 31. As a result of the tape being essentially flat as it passes through these guides, maximum use of the lateral misalignment correction properties of these guides is utilized.

A read means 35A and 35B is positioned between the two brake units 16 and 24. The read means are shown in block diagram form and may comprise any well-known means for sensing information recorded on the tape, such as for example, a bank of photocells and a light source. It is apparent, however, as previously discussed, that a write means rather than a read means could equally well be positioned between the two brake units 16 and 24.

Since the two brake units are positioned in close proximity to the read means 35, since maximum efficiency of the guiding elements positioned within the brake units is achieved, and since spring loaded clappers 22 and 30 prevent vertical misalignment of the tape, proper vertical and lateral alignment of the tape may both be achieved as the tape passes the reading means 35. If a short distance is maintained between the two brake units 16 and 24, there will be no danger of buckling of the tape within the area of the read means. Thus, for example, in an embodiment of the present invention in which the distance between the brakes was ¾ inch and tape having a thickness of .004 inch was utilized, no problem of buckling in the area of the read means was encountered. If, however, a greater distance is utilized between the brake units or if a thinner tape were utilized, any problem of buckling which may then arise could be solved by use of a guide clip. Such clips are known in the art, and, since they do not touch the tape, would not become a dust trap.

Braking of the tape in the present invention is achieved by passing current through the leads 20 and 21 of coil 19 and the leads 28 and 29 of coil 27. When braking is to take place, such current will be applied to both of these coils. As a result, a magnetic field is developed within the legs 17 and 18 and clapper 22 of brake unit 16 and within legs 25 and 26 and clapper 30 of brake unit 24. As a result, the clappers 22 and 30 will be tightly pinched against the oppositely positioned legs 17, 18, 25, and 26 to prevent longitudinal movement of the tape, thus causing the tape 15 to come to a sudden halt. If, however, a spliced portion of the tape is passing between the legs and clapper of either of the brake units at the time a braking current is applied to the coils, one or the other of the brake units may be incapacitated. This results since the splice on the fast moving tape may cause a clapper under which it passes momentarily to bounce as a result of the sudden increase in thickness of the tape in the area of the splice. Such bouncing may be minimized by the spring loading of the clapper and by tapering the entry portions of the clapper. However, some bounce will nevertheless occur and could interfere with the proper operation of a magnetic brake.

By utilizing two such brake units, however, the present invention avoids any braking difficulties which may be caused by splices within the tape, since at no time would both brakes be incapacitated by such splices. This results since succesive splices will, in practice, always be a distance apart which is greater than the distance between the brake units. As a result, at least one of the brake units will at all times be able quickly to stop the longitudinal movement of the tape.

Accordingly, the present invention provides a compact bidirectional tape braking and guiding means having all of the advantages previously discussed.

What has been described is considered to be only an illustrative embodiment of the present invention and, accordingly, it is to be understood that various and numerous other arrangements may be devised by one skilled in the art without departing from the spirit and scope of this invention.

What is claimed is:

1. In a tape transport system, a bidirectional tape braking and guiding device comprising:

- a first support member having a pair of spaced surfaces vertically supporting the lower surface of a longitudinally moving tape;
- a first guiding member, positioned between the pair of spaced surfaces of the first support member, vertically supporting and laterally guiding the longitudinally moving tape;
- a first movable means for contacting the upper surface of the tape over the pair of surfaces of the first support member;
- a second support member having a pair of spaced surfaces vertically supporting the lower surface of the longitudinally moving tape;

a second guiding member, positioned between the pair of spaced surfaces of the second support member, vertically supporting and laterally guiding the longitudinally moving tape;

a second movable means for contacting the upper surface of the tape over the pair of surfaces of the second support member;

an operating station positioned between the first and second support members for operating upon the longitudinally moving tape; and means for independently moving the first and second movable means against the spaced surfaces of the first and second support members, respectively, such that the tape is prevented from moving in a longitudinal direction.

2. In a tape transport system, a bidirectional tape braking and guiding device according to claim 1 in which the first and second guiding members each include a rotatable cylindrical rod, each rod having a plurality of slots cut therein, one of the slots having a selected dimension equal to the width of the particular tape being transported.

3. In a tape transport system, a bidirectional tape braking and guiding device according to claim 1 in which the operating station comprises sensing means for sensing information recorded on the tape.

4. In a tape transport system, a bidirectional tape reader and guide comprising:

a first support member having a surface vertically supporting the lower surface of a longitudinally moving tape;

a second support member having a surface vertically supporting the lower surface of the longitudinally moving tape;

sensing means positioned between the first and second support members for sensing information recorded on the tape;

a first rotatable guide member positioned between the first support member and sensing means, the guide member having a plurality of slots therein, each slot designed to provide lateral alignment, with respect to the sensing means, of tape having a particular width and information pattern, the tape passing through a particular one of the slots;

a second rotatable guide member positioned between the second support member and sensing means, the guide member having a plurality of slots therein, each slot designed to provide lateral alignment, with respect to the sensing means, of tape having a particular width and information pattern, the tape passing through a particular one of the slots;

a first movable member spring loaded against the upper surface of the tape opposite the first support member for preventing vertical misalignment of the tape while passing through the first guide member; and a second movable member spring loaded against the upper surface of the tape opposite the second support member for preventing vertical misalignment of the tape while passing through the second guide member.

5. In a tape transport system, a bidirectional tape reader and guide according to claim 4 further comprising:

a third support member having a surface vertically supporting the lower surface of the tape positioned between the first guide member and the sensing means;

the first movable member also being spring loaded against the upper surface of the tape opposite the third support member to prevent vertical misalignment of the tape as it passes the sensing means; and a fourth support member having a surface vertically supporting the lower surface of the tape positioned between the second guide member and the sensing means;

the second movable member also being spring loaded against the upper surface of the tape opposite the fourth support member to prevent vertical misalignment of the tape as it passes the sensing means.

6. A tape transport assembly comprising:

a first support member having a surface vertically supporting the lower surface of a longitudinally moving tape;

a second support member having a surface vertically supporting the lower surface of the longitudinally moving tape;

sensing means positioned between the first and second support members for sensing information recorded on the tape;

a first rotatable guide member positioned between the first support member and sensing means, the guide member having a plurality of slots therein, each slot designed to provide lateral alignment, with respect to the sensing means, of tape having a particular width and information pattern, the tape passing through a particular one of the slots;

a second rotatable guide member positioned between the second support member and sensing means, the guide member having a plurality of slots therein, each slot designed to provide lateral alignment, with respect to the sensing means, of tape having a particular width and information pattern, the tape passing through a particular one of the slots;

a third support member having a surface vertically supporting the lower surface of the tape, positioned between the first guide member and the sensing means;

a fourth support member having a surface vertically supporting the lower surface of the tape, positioned between the second guide member and the sensing means;

a first movable member spring loaded against the upper surface of the tape opposite the first and third support members;

a second movable member spring loaded against the upper surface of the tape opposite the second and fourth support members;

means for effecting an attractive force between the first movable member and the first and third support members sufficient to prevent the tape from moving in a longitudinal direction; and means for effecting an attractive force between the second movable member and the second and fourth support members sufficient to prevent the tape from moving in a longitudinal direction.

7. A tape transport assembly comprising:

means for longitudinally transporting a tape in a first direction past an operating station;

means for longitudinally transporting the tape in a second direction past the operating station;

first and second vertical alignment means positioned on opposite sides of the operating station for preventing vertical misalignment of the tape as it passes the operating station;

the first vertical alignment means being positioned between the operating station and a first lateral alignment means for preventing lateral misalignment of the tape as it passes the operating station;

the second vertical alignment means being poistioned between the operating station and a second lateral alignment means for preventing lateral misalignment of the tape as it passes the operating station;

the first lateral alignment means being positioned between the first vertical alignment means and a third vertical alignment means for preventing vertical misalignment of the tape as it passes the first lateral alignment means, the tape being transported in the first direction; and the second lateral alignment means being positioned between the second vertical alignment means and a fourth vertical alignment means for preventing vertical misalignment of the tape as it passes the second lateral alignment means, the tape being transported in the second direction.

8. A tape transport assembly according to claim 7 further comprising:

a first braking means, including the first and third vertical alignment means, for preventing movement of the tape in a longitudinal direction; and a second braking means including the second and fourth vertical alignment means, for preventing movement of the tape in a longitudinal direction.

9. A tape transport assembly according to claim 8 in which:

the first and second lateral alignment means comprise rotatable guide members having a plurality of slots therein, each slot designed to provide lateral alignment, with respect to the operating station, of tape having a particular width and information pattern, the tape passing through a particular one of the slots as determined by the tape's width and information pattern.

References Cited

UNITED STATES PATENTS

| | | | |
|---|---|---|---|
| 3,100,591 | 8/1963 | Trimble. | |
| 3,115,314 | 12/1963 | Manley et al. | 226—39 |
| 3,119,020 | 1/1964 | Olson et al. | 226—39 X |
| 3,136,467 | 6/1964 | Olson et al. | 226—39 X |
| 3,204,845 | 9/1965 | Griffiths | 226—199 |

FOREIGN PATENTS

| | | |
|---|---|---|
| 917,309 | 1/1963 | Great Britain. |

M. HENSON WOOD, Jr., *Primary Examiner.*

ALLEN N. KNOWLES, *Examiner.*